Figure 1:
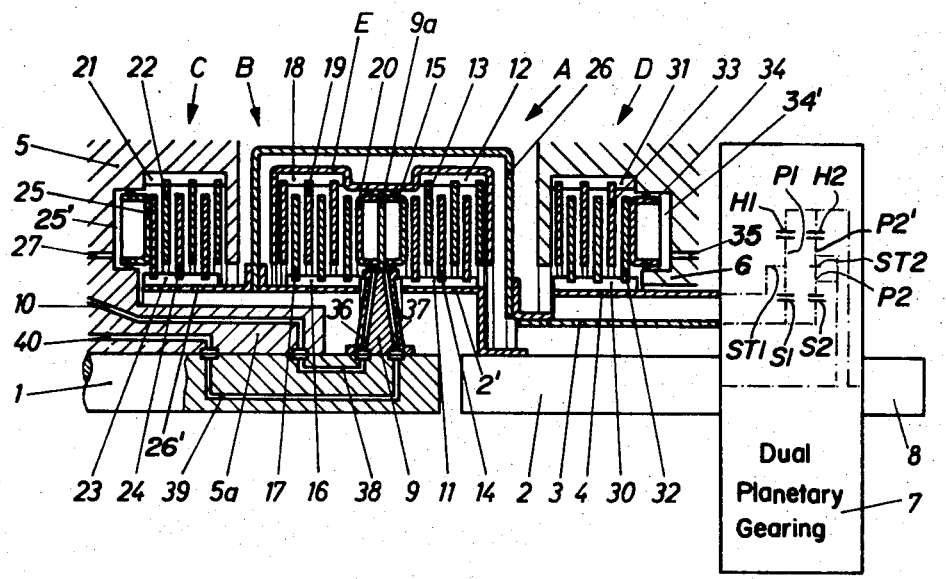

United States Patent
Dach

[15] 3,688,601
[45] Sept. 5, 1972

[54] AUTOMOTIVE TRANSMISSION WITH DUAL PLANET CARRIER

[72] Inventor: Hansjorg Dach, Friedrichshafen, Germany

[73] Assignee: Zahnradfabrik Friedrichshaften Aktiengesellschaft, Friedrichshafen, Germany

[22] Filed: April 28, 1971

[21] Appl. No.: 138,082

[30] Foreign Application Priority Data

April 28, 1970 Germany..........P 20 20 634.2

[52] U.S. Cl..................................74/753, 192/18 A
[51] Int. Cl............................F16h 3/44, F16d 67/02
[58] Field of Search........................74/753; 192/18 A

[56] References Cited

UNITED STATES PATENTS

| | | | |
|---|---|---|---|
| 2,918,832 | 12/1959 | Meyers | 192/18 A X |
| 3,088,552 | 5/1963 | Christenson et al. | 192/18 A X |
| 3,115,793 | 12/1963 | Hobbs | 74/753 X |
| 3,319,491 | 5/1967 | Simpson | 74/753 X |
| 3,477,313 | 11/1969 | Ringe | 192/18 A X |
| 3,596,537 | 8/1971 | Koivumen | 74/759 |

Primary Examiner—Arthur T. McKeon
Attorney—Karl F. Ross

[57] ABSTRACT

An automotive transmission with dual planetary gearing includes an input shaft, an output shaft and three intermediate shafts coaxially disposed in a housing, the three intermediate shafts being nested on the input side of the planetary-gear assembly. The middle one of the three nested shafts is rigid with a sleeve carrying two sets of foils which form part of a first brake and a first clutch, respectively, the first brake further including a set of co-operating stationary foils carried on the housing whereas the first clutch additionally comprises a set of coacting movable foils carried on an extension of the input shaft. The latter extension also carries a set of foils forming part of a second clutch further including a set of foils on the innermost nested shaft. The outermost nested shaft and another housing portion also carry interleaved sets of foils forming part of a second brake.

10 Claims, 2 Drawing Figures

INVENTOR
Hansjörg Dach
ATTORNEY:
Karl F. Ross

AUTOMOTIVE TRANSMISSION WITH DUAL PLANET CARRIER

My present invention relates to an automotive transmission used for coupling a vehicular engine to the traction wheels of the vehicle with a variable speed ratio. More particularly, the invention is applicable to a transmission wherein an engine-driven input shaft is connected to an output shaft through a pair of cascaded planetary-gear trains with the aid of two clutches and two brakes that are selectively operated to establish three different forward speeds (low or "first gear", intermediate or "second gear" and high or "third gear") and one reverse speed, generally with interposition of a hydraulic torque converter or fluid coupling between the engine and the input shaft. Reference in this connection may be made to U.S. Pat. No. 2,856,794 to H. W. Simpson as well as to commonly owned copending applications Ser. Nos. 855,315, now U.S. Pat. No. 3,592,082, 855,136, now U.S. Pat. No. 3,600,975, and 855,137, now U.S. Pat. No. 3,580,109 (Franz Hill), all filed Sept. 4, 1969.

The general object of my present invention is to provide a compact structural mounting for the several clutches and brakes utilized in such a transmission.

More specifically, my invention aims at providing a clutch and brake assembly which can be installed within the transmission housing on one side of the associated planetary gearing so that the latter need not be disturbed during inspection or repair of the actuating mechanism.

The planetary-gear system herein contemplated is provided with three intermediate shafts, the input shaft being connected with one of these intermediate shafts by one of he two clutches in all three forward positions and with the second of these shafts by the other clutch in the reverse position and in third gear. The second intermediate shaft is arrested by one of the two brakes in second gear whereas the third intermediate shaft is arrested in first gear by the other brake. Thus, the aforesaid shaft is alternately engageable by a brake or a clutch to establish second gear, third gear or reverse.

In accordance with this invention, the three intermediate shafts are coaxially nested, with the above-mentioned second shaft in a middle position between the first and third shafts. This middle shaft is rigid with a sleeve carrying one portion of the first brake and one portion of the second clutch, a complementary portion of the first brake being mounted on the housing while a complementary portion of the second clutch is carried on the input shaft. The second brake has complementary portions supported on the housing and on the third nested shaft, respectively, whereas the coacting portions of the first clutch are disposed on he input shaft and on the innermost nested shaft. All these coacting portions are advantageously represented by sets of interleaved annular foils which may be clamped into locking engagement by an actuating mechanism preferably including independent fluid-operated pistons supported partly on the housing and partly on the input shaft.

It will be convenient to mount the fixed portions of the two brakes on two separable housing parts, one of them remote from and the other of them proximal to the planetary gearing, with the clutch-supporting shaft extension disposed as a generally cylindrical jacket between these housing parts.

Figure 2:
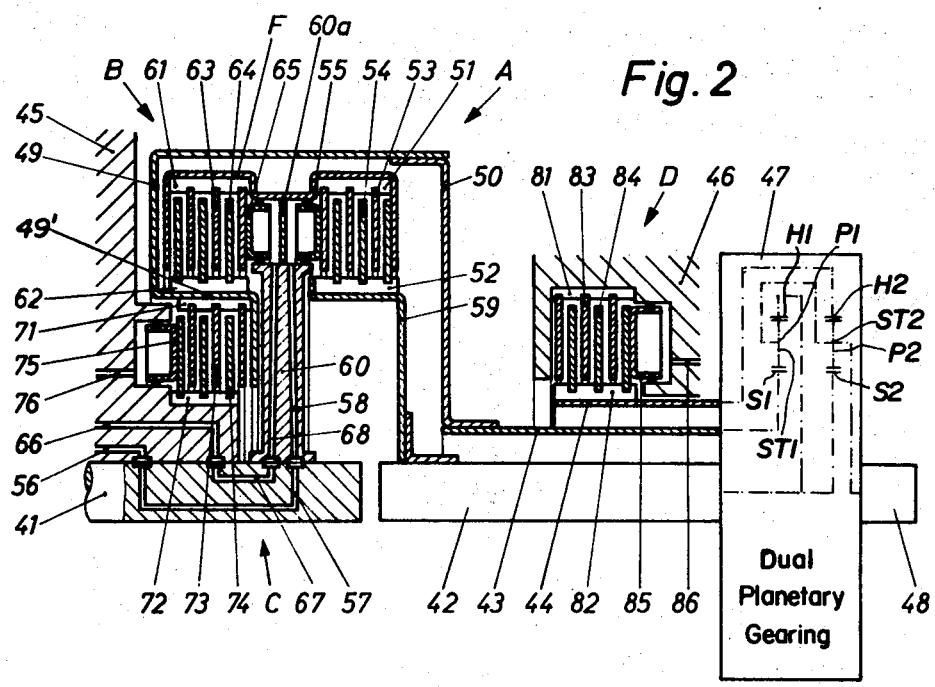

The above and other features of my invention will be described in detail hereinafter with reference to the accompanying drawing in which:

FIG. 1 is a side-elevation view, partly in longitudinal section, of a transmission system embodying the invention; and FIG. 2 is a similar view of a second embodiment.

In both embodiments I have designated with A and B the two clutches labeled K1 and K2 in the three commonly owned applications identified above, the two brakes labeled D1 and D2 in these applications having been identified by the letters C and D.

FIG. 1 shows a number of coaxial shafts including an engine-driven input shaft 1, three nested shafts 2, 3 and 4 on the input side of a dual planetary gearing 7, and an output shaft 8 on the opposite side of that gearing. The latter may have any of the constructions disclosed in he three copending applications; by way of example, I have symbolically illustrated in FIG. 1 an assembly similar to that of Hill application Ser. No. 855,137. This assembly includes a pair of sun gears S1, S2 keyed to middle shaft 3, a pair of ring gears H1, H2 keyed to output shaft 8, a first planet carrier or web ST1 on outer shaft 4, and a second planet carrier or web ST2 on inner shaft 2.

Web ST1 carries a pinion P1 in mesh with gears S1 and H1; web ST2 carries tow meshing pinions P2, P2' respectively engaging the gears S2 and H2.

The transmission housing is divided into two separable parts 5 and 6, the planetary gearing being enclosed by part 6 for which part 5 serves as a detachable lid. Between these two housing parts, input shaft 1 is provided with an annular rib 9 framed by a ring 9a, this ring having an I-shaped profile so as to form two annular recesses on opposite sides to accommodate a pair of annular pistons 15 and 20 centered on the axis of the shafts. Piston 15 is displaceable toward the right by hydraulic fluid admitted to its cylinder through passages 40, 39 and 37 in housing part 5, shaft 1 and rib 9, respectively; piston 20 is similarly displaceable to the left by hydraulic fluid passing through channels 10, 38 and 36.

It will be understood that the connections between the fixed channels 10, 40 in the housing part 5 and the mobile channels 38, 39 in shaft 1 includes a pair of annular grooves in the housing (at the ends of channels 10, 40) and/or a pair of annular grooves in the shaft (at the entrances of channels 38, 39) to insure continuous communication.

The first clutch A, operable by the piston 15, comprises two sets of interleaved flexible metal foils 13, 14 whose resiliency tends to keep them separated and to repress the piston into its cylinder. Foils 13 are carried on a set of peripherally spaced, axially extending ribs 12 on the inner surface of a tubular extension E of shaft 1 rigid with ring 9a. Foils 14 are similarly supported on ribs 11 spacedly mounted on the outer surface of an annular flange 2' integral with shaft 2. Thus, actuation of clutch A by a loading of piston 15 couples the inner shaft 2 with input shaft 1 for entrainment thereby.

Middle shaft 3 is integral with a sleeve 26 which envelops the extension E of shaft 1 and terminates in a skirt 26' supporting foils 19 of the second clutch B and foils 22 of the first brake C by means of peripherally spaced ribs 16 and 23, respectively. The coacting foils 22 of brake C are mounted on housing part 5 with the aid of ribs 21 whereas those of clutch B are held in the left-hand half of the jacket E by means of ribs 18. Clutch B is operated by the piston 20 whereas brake C responds to actuation of a piston 25 in an annular complementary housing recess 25' receiving hydraulic fluid via a channel 27.

The second brake D comprises coacting foils 32, mounted on outer shaft 4 with the aid of ribs 30, and 33, carried on housing part 6 by means of ribs 31. This housing part also has an annular recess 34' accommodating a ring-shaped piston 34 which receives its fluid supply through a channel 35.

The in-line arrangement of clutches and brakes A–D, as shown in FIG. 1, requires a certain axial length for the overall assembly which could be reduced at the expense of an increased overall diameter by a partly concentric arrangement as illustrated in FIG. 2. The latter arrangement differs from the first embodiment mainly by the fact that the sleeve 49 supporting portions of clutch B and brake C, i.e. foils 63 and 73 thereof, is so mounted on an annular flange 50 of middle shaft 43 as to underreach, with its skirt 49', the tubular extension F of input shaft 41 which supports the coacting foils 63 of clutch B and 53 of clutch A. Thus, the skirt 49' is provided on its outer surface with ribs 62 supporting the foils 64 and on its inner surface with ribs 71 holding the foils 73. Foils 53 and 63 of clutches A and B are mounted, like their counterparts in FIG. 1, on the inner surface of jacket F with the aid of ribs 51 and 61. An annular flange 59 on inner shaft 42 carries foils 54 of clutch A by means of ribs 52. Brake D is similar to the corresponding brake of FIG. 1, comprising interleaved foils 83 and 84 supported by ribs 81 on the housing part 46 (proximal to gearing 47) and by ribs 82 on outer shaft 44. Clutches A and B are operated by means of annular pistons 55, 65 in a ring 60a of I-shaped profile embracing an annular rib 60 of input shaft 41; the fluid-supply channels for pistons 55, passing partly through shaft 41, have been designated 56–58 and 66–68. Brake C is operable by piston 75 supplied through a channel 76 in the detachable housing part 45; the corresponding piston of brake D has been designated 85 and is supplied through a channel 86.

As in the preceding embodiment, the connection between channels 56, 66 and channels 57, 67 should include one or two pairs of annular grooves.

The dual planetary gearing 47 of FIG. 2, whose output shaft is designated 48, may again have any of the constructions disclosed in the three copending applications referred to above. In the specific example schematically illustrated, this gearing corresponds to that of FIG. 1 of Ott application Ser. No. 855,315 with a first sun gear S1 keyed to middle shaft 43, a first ring gear H1 and a second sun gear S2 keyed to inner shaft 42, a pair of planet carriers ST1, ST2 fixed to output shaft 48, and a second ring gear H2 on outer shaft 44. Planet gears P1 and P2 on webs ST1 and ST2 mesh with gears S1, H1 and S2, H2, respectively.

It will be noted that, in both embodiments, the rotating sleeve 26 or 49 integral with the middle nested shaft forms a protective envelope for the moving elements situated between the two housing parts 5, 6 or 45, 46. With the possible exception of lid 45 in FIG. 2, each of these housing parts may be diametrically split for easier access to the brake assemblies mounted therein.

The selective admission of operating fluid to the several brakes and clutches may be controlled either manually or automatically, as is well known per se.

I claim:

1. An automotive transmission for providing a plurality of speed ratios between an engine-driven input shaft and an output shaft, comprising:
   a planetary-gear assembly provided with three coaxially nested intermediate shafts and with a driven part joined to said output shaft;
   a housing surrounding said nested shafts in coaxially juxtaposed relationship with said input shaft;
   a sleeve rigid with the middle one of said nested shafts within said housing;
   a first brake with a first pair of coacting portions carried on said sleeve and on said housing, respectively;
   a second brake with a second pair of coacting portions carried on the outer one of said nested shafts and on said housing, respectively;
   a first clutch with a third pair of coacting portions carried on said input shaft and on the inner one of said nested shafts, respectively;
   a second clutch with a fourth pair of coacting portions carried on said input shaft and on said sleeve, respectively; and
   first, second, third and fourth actuating means for selectively operating said first brake, second brake, first clutch and second clutch, respectively.

2. A transmission as defined in claim 1 wherein said input shaft is provided with a tubular extension supporting the first-mentioned portions of said third and fourth pairs.

3. A transmission as defined in claim 2 wherein said sleeve envelops said extension and terminates in a tubular skirt nested within said extension while defining therewith an annular space, the coacting portions of said second clutch being disposed in said space.

4. A transmission as defined in claim 3 wherein said inner one of said nested shafts is provided with an annular flange nested alongside said skirt in said extension while defining therewith another annular space accommodating the coacting portions of said first clutch.

5. A transmission as defined in claim 3 wherein the first-mentioned portion of said first pair is carried on an outer surface of said skirt in axially paced relationship with the coacting portions of said first clutch.

6. A transmission as defined in claim 3 wherein the first-mentioned portion of said first pair is carried on an inner surface of said skirt in nested relationship with the coacting portions of said second clutch.

7. A transmission as defined in claim 2 wherein said input shaft is provided with an annular rib supporting said third and fourth actuating means together with said extension, said rib being provided with internal channels for supplying operating fluid to said third and fourth actuating means.

8. A transmission as defined in claim 2 wherein said housing comprises two separable parts remote from and proximal to said assembly, respectively, on opposite sides of said extension, the last-mentioned portion of said first brake being carried on the remote housing part, the last-mentioned portion of said second brake being carried on the proximal housing part.

9. A transmission as defined in claim 1 wherein said planetary-gear assembly comprises six interacting elements including two sun gears, two ring gears and two planet carriers, a first pair of said elements being jointly connected with one of said shafts other than said input shaft, a second pair of said elements being jointly connected with another of said shafts other than said input shaft, the two remaining elements being individually connected with the remaining shafts other than said input shaft.

10. A transmission as defined in claim 1 wherein said coacting portions comprises sets of interleaved annular foils.

* * * * *